United States Patent [19]

Nakamura

[11] Patent Number: 5,337,084
[45] Date of Patent: Aug. 9, 1994

[54] AUTOMATIC FOCUSING DEVICE UTILIZING A TREND OF VARIATION AND DEGREE OF RELIABILITY OF A FOCUSSING EVALUATION VALUE SIGNAL TO IMPROVE IMAGE FOCUSING

[75] Inventor: Takahiro Nakamura, Tochigi, Japan

[73] Assignee: Sharp Kabushiki Kaisha, Osaka, Japan

[21] Appl. No.: 862,361

[22] Filed: Apr. 2, 1992

[30] Foreign Application Priority Data

Apr. 3, 1991 [JP] Japan .................. 3-071159

[51] Int. Cl.⁵ ............... H04N 5/232; H04N 5/30; H04N 5/138
[52] U.S. Cl. .................... 348/345; 348/353; 348/356; 348/363; 354/400; 354/402
[58] Field of Search .............. 358/227; 354/400, 402; 250/201.7

[56] References Cited

U.S. PATENT DOCUMENTS

| | | | |
|---|---|---|---|
| 4,575,237 | 3/1986 | Suzuki | 356/1 |
| 4,600,832 | 7/1986 | Grund | 250/201 |
| 4,945,220 | 7/1990 | Mallory et al. | 250/201.3 |
| 5,193,124 | 3/1993 | Subbarao | 382/41 |

FOREIGN PATENT DOCUMENTS

| | | | |
|---|---|---|---|
| 0194162 | 1/1986 | European Pat. Off. | H04N 5/232 |
| 0331502 | 3/1989 | European Pat. Off. | H04N 5/232 |
| 0341695 | 5/1989 | European Pat. Off. | H04N 5/232 |
| 414964 | of 0000 | Japan . | |
| 602827 | of 0000 | Japan . | |
| 6172967 | of 0000 | Japan . | |
| 63-178523 | 7/1988 | Japan | H04N 5/232 |
| 1160263 | 6/1989 | Japan | H04N 5/232 |

*Primary Examiner*—Michael T. Razavi
*Assistant Examiner*—Bipin Shalwala

[57] ABSTRACT

An automatic focusing device including a lens group by which movement of a focused field of an object changes, a drive motor for moving the lens group, a luminance processing circuit for image-sensing the object through the lens group to extract a luminance signal, an accumulating circuit for outputting a focusing evaluation value signal for evaluating a focal condition of the object on the basis of the extracted luminance signal, a least squares circuit for determining reliability of the output focusing evaluation value signal, and a control circuit for controlling the drive motor to improve the focal condition of the object on the basis of the determined reliability.

4 Claims, 6 Drawing Sheets

AUTOMATIC FOCUSING DEVICE UTILIZING A TREND OF VARIATION AND DEGREE OF RELIABILITY OF A FOCUSSING EVALUATION VALUE SIGNAL TO IMPROVE IMAGE FOCUSING

BACKGROUND OF THE INVENTION

1. Field of the Invention

The present invention relates to automatic focusing devices, and particularly to an improvement of an automatic focusing device of a video signal processing system in an image sensing apparatus such as a video camera.

2. Description of the Background Art

An image sensing apparatus such as a video camera is generally provided with an automatic focusing device for automatically focusing on an object. One operational principles of automatic focusing devices is the method of video signal processing system called mountain climbing control such as one recited in Japanese Patent Publication No. 39-5265.

In the mountain climbing control, a signal in a predetermined high frequency band is extracted from a luminance signal obtained from an image sensing element and an amplitude thereof is detected and converted into a level signal. A level signal thus obtained is subjected to an accumulating process for every predetermined period such as one field or one frame. The resulting value (hereinafter referred to as a focusing evaluation value) is determined for every field or frame.

When a position of a lens to be focused is close to a position of an in-focus state, a so-called edge portion of the obtained image is sharp. A signal forming such an image includes many high frequency components. On the other hand, in a defocused image, the edge portion is not sharp. Such a signal includes a relatively small amount of high frequency components. Accordingly, evaluation can be made as to whether a lens is at an in-focus position or not by detecting an amount of high frequency components in luminance signal components outputted by a video signal processing circuit. The above-mentioned focusing evaluation value is useful for evaluating the focusing state.

FIG. 5 is a diagram illustrating relation between a lens position and a focusing evaluation value. In the figure, the abscissa indicates positions of a lens, the ordinate indicates focusing evaluation values, and the curve 40 indicates characteristics of focusing evaluation values of high frequency components. The lens position P in the figure denotes a position of a lens when it is in a complete in-focus state.

As clearly seen from FIG. 5, the focusing evaluation value takes its maximum value at the lens position P. The focusing evaluation value increases or decreases at each of positions Q and R before and after the lens position P.

Accordingly, in mountain climbing control, while moving a lens in one direction, a focusing evaluation value is obtained for each field, for example. The obtained focusing evaluation value is compared with a focusing evaluation value one field before. As a result, if the focusing evaluation value in the present field is larger than the previous focusing evaluation value, the lens is further moved in the same direction as before. On the other hand, if the focusing evaluation value one field before is larger than the present focusing evaluation value, the lens is moved in the opposite direction. This is because, as seen from FIG. 5, a determination can be made that the position of lens has gone over the in-focus position P.

As described above, the lens is stopped at a position where a focusing evaluation value the same as a focusing evaluation value one field before can be obtained.

For example, suppose that a lens is at lens position Q of FIG. 5 in an initial state. A focusing evaluation value starts decreasing when the lens goes over the in-focus position P and reaches the position R by the abovedescribed mountain climbing control. Accordingly, the lens is returned in a negative direction and stopped at the in-focus position P. By doing so, the lens automatically moves to a position of an in-focus state.

As shown in FIG. 6, an object is generally located on a central portion of a field 50 in image sensing. For focusing upon the object, the target of focusing is usually not the entirety of field 50 but a focusing control area 51 which is a part in the center.

Also, in the above-described mountain climbing control, a false peak may occur in the focusing evaluation value due to noise or so. Accordingly, control is generally performed by checking whether a plurality of focusing evaluation values are continuously increasing, or decreasing.

FIG. 7 is a block diagram illustrating structure of one example of a video camera having a conventional automatic focusing device. In the figure, the video camera includes a lens system 2, a CCD (Charge Coupled Device) 3 provided on a light-receiving surface arranged at a position where an image of an object 30 is formed by lens system 2 for converting an image of the object into an electrical signal, a CDS (Correlation Double Sampling) circuit 4 for correlation-double-sampling a signal provided from CCD 3 as an output, a video signal processing circuit 5 for processing a signal sampled by CDS circuit 4 and outputs video signals (a luminance signal Yout, a chroma signal Cout), a motor 6 for moving a focusing lens included in lens system 2, and an automatic focusing device 1a for determining a direction of moving the focusing lens for focusing by processing a luminance signal Yout outputted by video signal processing circuit 5 to obtain a focusing evaluation value for controlling motor 6.

Video signal processing circuit 5 includes an AGC (Auto Gain Control) circuit 7 for amplifying a signal outputted by CDS circuit 4 to a predetermined level, a color separating circuit 8 for separating a signal outputted by AGC circuit 7 into a luminance signal and two color difference signals for outputting, a chroma processing circuit 9 for processing color difference signals outputted from color separating circuit 8 and outputting the same as a chroma signal Cout, and a luminance processing circuit 10 for receiving a luminance signal from color separating circuit 8 and outputting the same as an output luminance signal Yout.

Automatic focusing device 1a includes a synchronization separating circuit 11 for separating a vertical synchronization signal Vs and a horizontal synchronization signal Hs from a luminance signal Yout, a gate circuit 12 responsive to synchronization signals Vs and Hs provided from synchronization separating circuit 11 for passing only a signal corresponding to focusing controlled area 51 shown in FIG. 6, a BPF (bandpass filter) 13 for passing only high frequency components in a signal provided from gate circuit 12, a detecting circuit 16 for detecting a level of a signal outputted by BPF 13, a sampling circuit 24 for sampling a signal outputted by detecting circuit 16 at a predetermined frequency, an accumulating circuit 23 for obtaining a focusing evaluation value by accumulating a value outputted by sampling circuit 24 over one field, for example, and controlling circuit 21 for controlling movement of motor 6 so that a focusing lens is moved to an in-focus position on the basis of focusing evaluation values outputted by accumulating circuit 23.

In FIG. 7, a conventional video camera having such an automatic focusing device 1a operates as described below. Lens system 2 forms an image of object 30 on a light receiving plane of CCD 3. CCD 3 converts the formed image of object 30 into an electric signal by photoelectric conversion. CDS circuit 4 correlation-double-samples a signal outputted from CCD 3 and provides it to AGC circuit 7.

AGC circuit 7 amplifies a level of a signal outputted from CDS circuit 4 to a predetermined level and applies the same to color separating circuit 8. Color separating circuit 8 separates a signal amplified by AGC circuit 7 into color difference signals and a luminance signal and provides the color difference signals to chroma processing circuit 9 and the luminance signal to luminance processing circuit 10, respectively. Chroma processing circuit 9 processes color difference signals provided from color separating circuit 8 and externally outputs the same as a chroma signal Cout. Luminance processing circuit 10 processes a luminance signal applied from color separating circuit 8 and externally outputs the same as an output luminance signal Your. Luminance signal Yout is also applied to gate circuit 12 and synchronization separating circuit 11 of automatic focusing device 1a.

Synchronization separating circuit 11 separates a vertical synchronization signal Vs and a horizontal synchronization signal Hs from a luminance signal Your and provides the same to gate circuit 12. Gate circuit 12 applies a luminance signal to BPF 13 in synchronization with a vertical synchronization signal Vs, a horizontal synchronization signal Hs and a predetermined clock signal only when a position which is currently being scanned is inside focusing controlled area 51 shown in FIG. 6. BPF 13 extracts only predetermined high frequency band components in the luminance signal outputted from gate circuit 12 and provides the same to detecting circuit 16. Detecting circuit 16 detects a level of a signal of the provided high frequency band components and provides the same to sampling circuit 24. Sampling circuit 24 samples a level signal outputted from detecting circuit 16 at a predetermined frequency and provides the same to accumulating circuit 23. Accumulating circuit 23 accumulates a signal applied from sampling circuit 24 for one field and applies the same to control circuit 21. An accumulated value indicates a focusing evaluation value of that field. Control circuit 21 controls motor 6 on the basis of the focusing evaluation value provided from accumulating circuit 23 to move the focusing lens to an in-focus position by the above-described mountain clinching control. The automatic focusing process is thus performed by moving the focusing lens inside a lens system to an in-focus position using focusing evaluation values.

The above-described conventional automatic focusing device has the following problems. In order to avoid malfunctions due to noise or the like, a determination is made as to whether it is now in an increasing direction toward a peak or it has already gone over the peak by checking whether a plurality of focusing evaluation values are continuously increasing or decreasing. For example, if focusing evaluation values are continuously increasing twice or more, it is regarded that it is now in an increasing direction toward the peak and the focusing lens is moved in the same direction as before, and on the other hand, if they are continuously decreasing twice or more, a determination can be made that it has already gone over the peak, and the focusing leans is moved in the opposite direction.

However, if the focusing evaluation value continues varying alternately, as increasing and decreasing as shown in FIG. 3A, the above-described method can not make correct determinations. That is, as shown by the first through eighth focusing evaluation values in FIG. 3A, even through the focusing evaluation values are apparently becoming smaller on the whole, a determination that it has already passed the peak cannot be made. In this case, a determination is made that it has already gone over the peak only by seeing the seventh through ninth focusing evaluation values.

Furthermore, when taking an image of a moving object, for example, a focusing evaluation value may vary largely having no connection with a position of a focusing lens. That is to say, when a focusing evaluation value varies without any order as shown in the variation of the first through ninth values of FIG. 3B, a problem similar to the above-described one occurs. In such a case, since the reliability of focusing evaluation values is low, hunting may occur and the image will be out of focus in conventional apparatus.

SUMMARY OF THE INVENTION

It is an object of the present invention to improve reliability of focusing operation in an automatic focusing device.

In order to achieve the above-mentioned object, an automatic focusing device according to the present invention includes a lens group by which movement of a focused field of an object changes, a drive motor for moving the lens group, an extracting circuit for image-sensing an object through the lens group to extract a luminance signal, a signal outputting circuit for outputting a focusing evaluation value signal for evaluating a focusing condition of an object on the basis of the extracted luminance signal, a determining circuit for determining reliability of the outputted focusing evaluation value signal, and a control circuit for controlling the drive motor to improve the focusing condition of the object on the basis of the determined reliability.

In the automatic focusing device configured as described above, movement of the lens group is controlled while determining reliability of focusing evaluation values, so that the reliability of focusing operation is improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
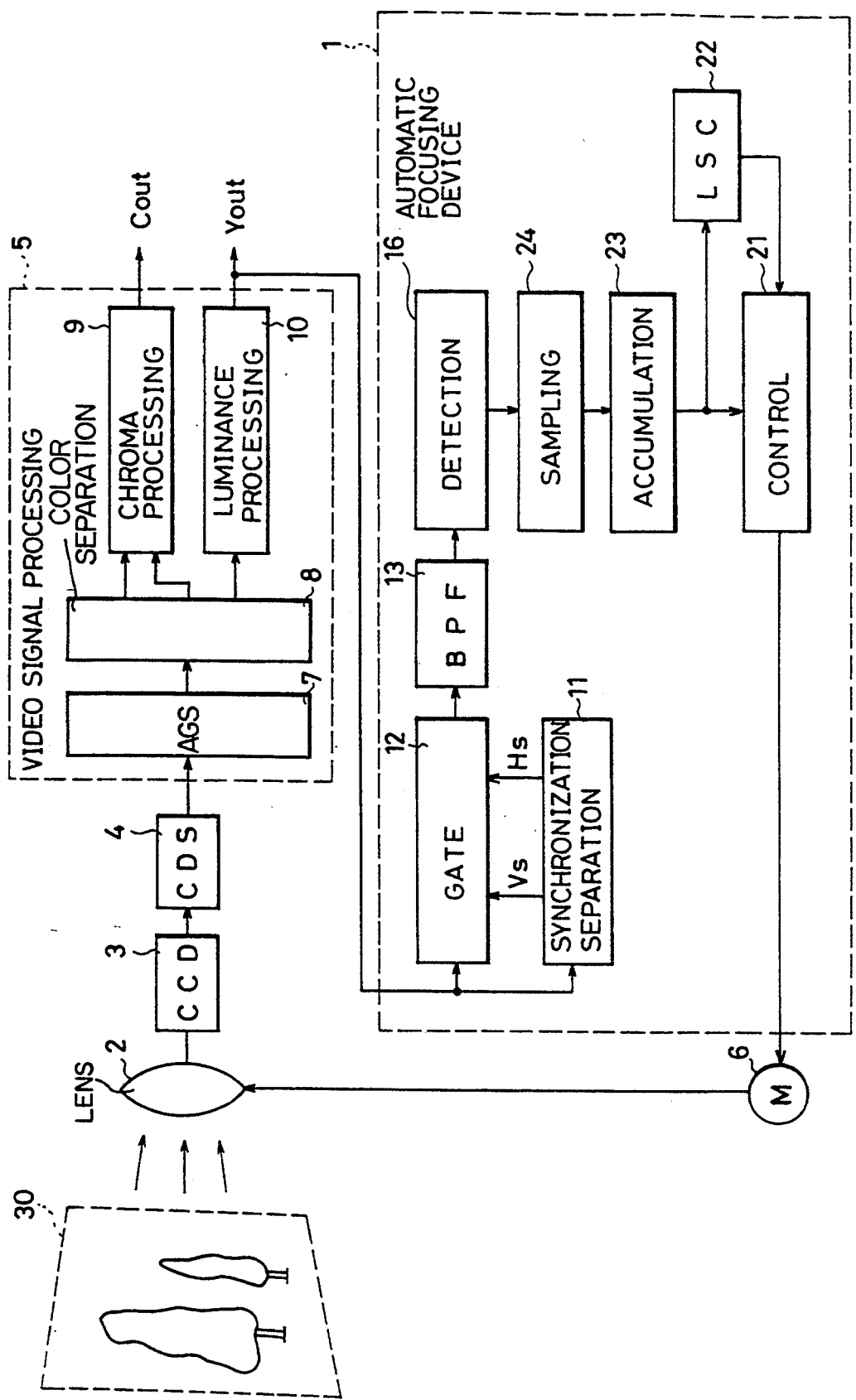
FIG. 1 is a block diagram illustrating a structure of a video camera according to one embodiment of the present invention.

FIG. 1 is a block diagram of a video camera provided with an automatic focusing device 1 according to one embodiment of the present invention. The video camera shown in the figure is the same as that shown in FIG. 7 except for a part of automatic focusing device 1. In the two figures, the same characters and names are allotted to the same parts and functions thereof are also the same. Accordingly, detailed description about the overlapping parts is not repeated herein.

Figure 7:
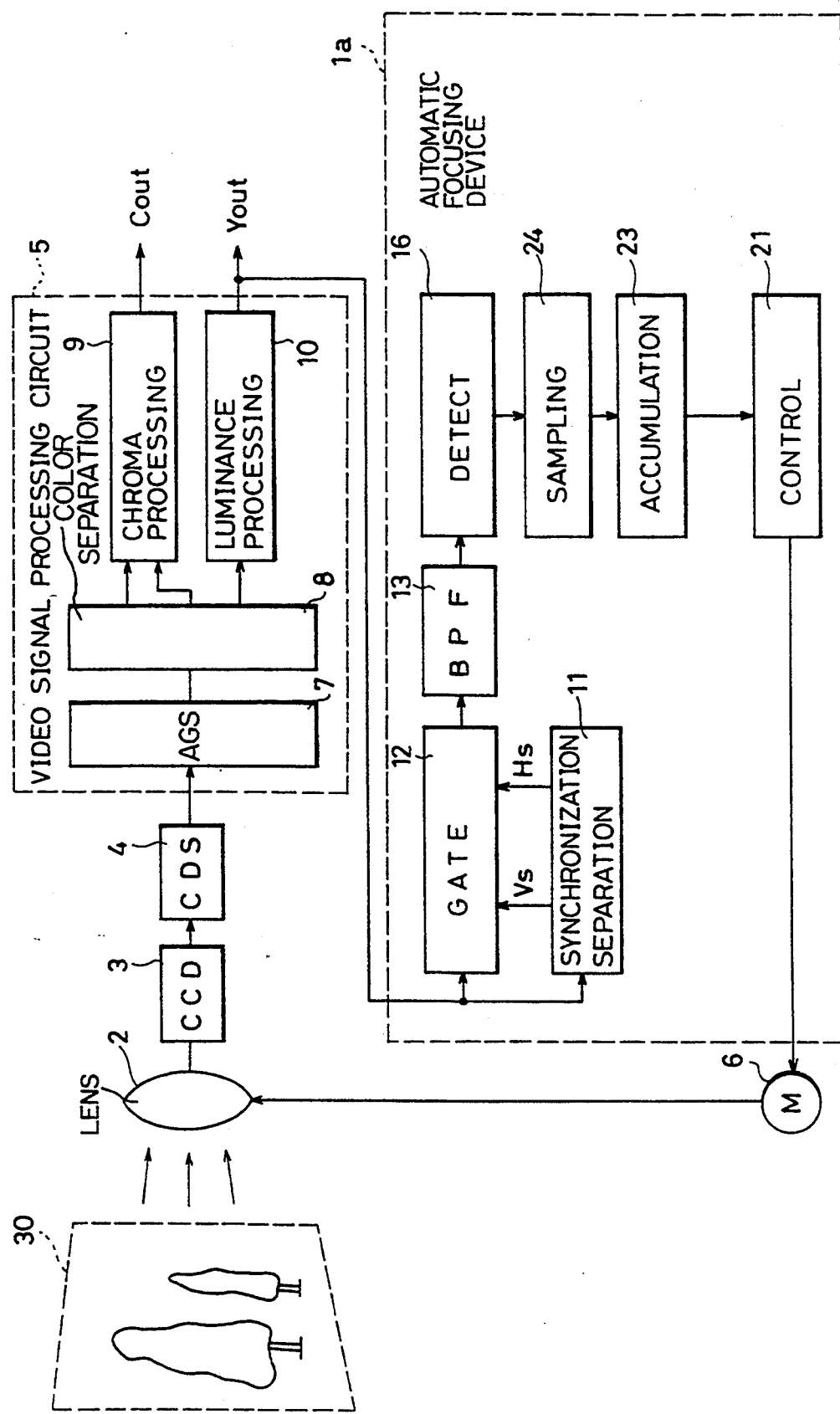
FIG. 7 is a block diagram illustrating a structure of a video camera using a conventional automatic focusing device.

In automatic focusing device 1 in FIG. 1, the synchronization separating circuit 11, the gate circuit 12, the BPF 13, the detecting circuit 16, the sampling circuit 24, the accumulating circuit 23 are the same as those in FIG. 7. In the present invention, an LSC (Least Squares Calculation) circuit 22 is provided between accumulating circuit 23 and a control circuit 21 for sampling for a predetermined period focusing evaluation values outputted from accumulating circuit 23, carrying out approximation by the method of least squares, and detecting a trend of variation of focusing evaluation values and a degree of reliability thereof (referred to as a focusing variation value hereinafter), and an output thereof is supplied to control circuit 21. Control circuit 21 controls rotation of a motor 6 on the basis of focusing evaluation values outputted from accumulating circuit 23 and a focusing variation value outputted from LSC circuit 22 to move a focusing lens in a lens system 2 to an in-focus position.

Figure 2:
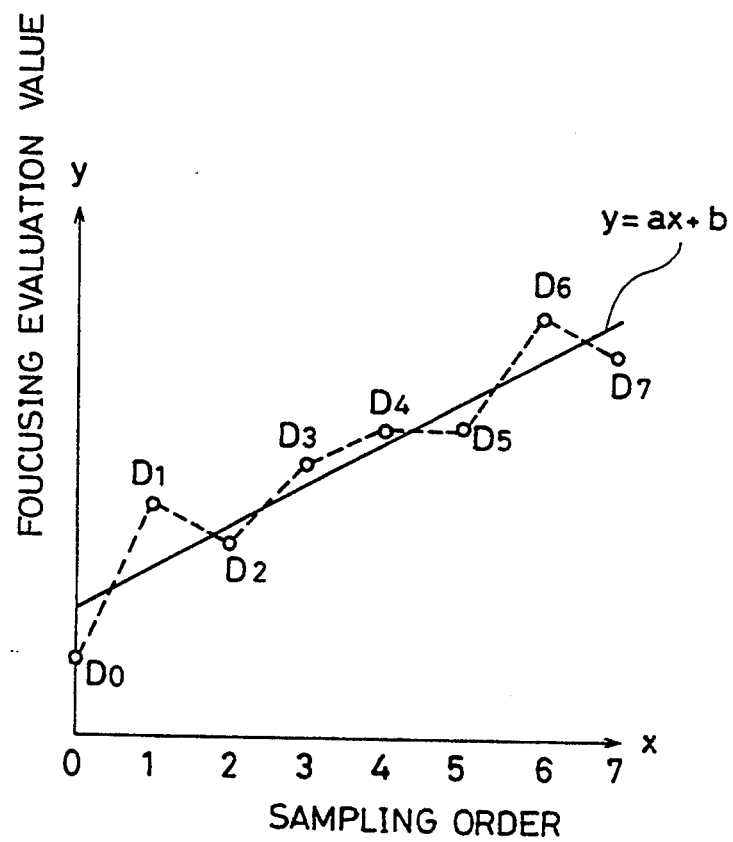
FIG. 2 is a graph showing one example of processing contents of the LSC circuit of FIG. 1.

FIG. 2 is a graph for description of one example of operation by the LSC circuit 22 shown in FIG. 1.

First, focusing evaluation values inputted into LSC circuit 22 are sampled eight times, for example, which are expressed as D0 through D7 in order. Then, supposing a two-dimensional coordinate system in which the x axis corresponds to the order of focusing evaluation values (zero through seven, herein) and the y axis corresponds to magnitudes of focusing evaluation values, D0 through D7 are respectively plotted therein, as indicated in the table below:

| | x | y |
|---|---|---|
| D0 | 0 | 10 |
| D1 | 1 | 30 |
| D2 | 2 | 25 |
| D3 | 3 | 35 |
| D4 | 4 | 40 |
| D5 | 5 | 40 |
| D6 | 6 | 55 |
| D7 | 7 | 50 |

A straight line (y=ax+b) is calculated so that differences between a line (broken line) connecting respective points expressing these values plotted and the straight line are smallest. The gradient "a" and the intercept "b" can be calculated with the figures in the table using the method of least squares as shown in the following expressions (1) and (2).

$$a = \frac{n \sum_{i=1}^{n} x_i y_i - \sum_{i=1}^{n} x_i \sum_{i=1}^{n} y_i}{n \sum_{i=1}^{n} x_i^2 - \left(\sum_{i=1}^{n} x_i\right)^2} \approx 5.42 \quad (1)$$

$$b = \frac{\sum_{i=1}^{n} y_i - a \sum_{i=1}^{n} x_i}{n} \approx 16.7 \quad (2)$$

Subsequently, a residual sum of squares r is calculated according to the following expression (3)

$$r = \sum_{i=1}^{n} (ax_i + b - y_i)^2 \approx 190 \quad (3)$$

The calculated gradient a and the residual sum of squares r are outputted to control circuit 21 as focusing variation values A and R, respectively. In the example of the table, for example, assuming that values of 10, 30, 25, 35, 40, 40, 55 and 50 are inputted in order as focusing evaluation values, the gradient a is approximately 5.42, the intercept b is approximately 16.7, and the residual sum of squares r is approximately 190, and then a focusing variation value A=5.42 and a focusing evaluation value R=190 are outputted to control circuit 21. The focusing variation value A indicates trend of variation of focusing evaluation values and the focusing variation value R indicates the degree of reliability of variation of focusing evaluation values.

Referring to FIGS. 1 through 3, the automatic focusing device 1 of the present invention will be described below. Since the mountain climbing control by control circuit 21 is the same in its basic part as that described in the conventional art, different points only from the conventional art will be described now.

Figure 3A:
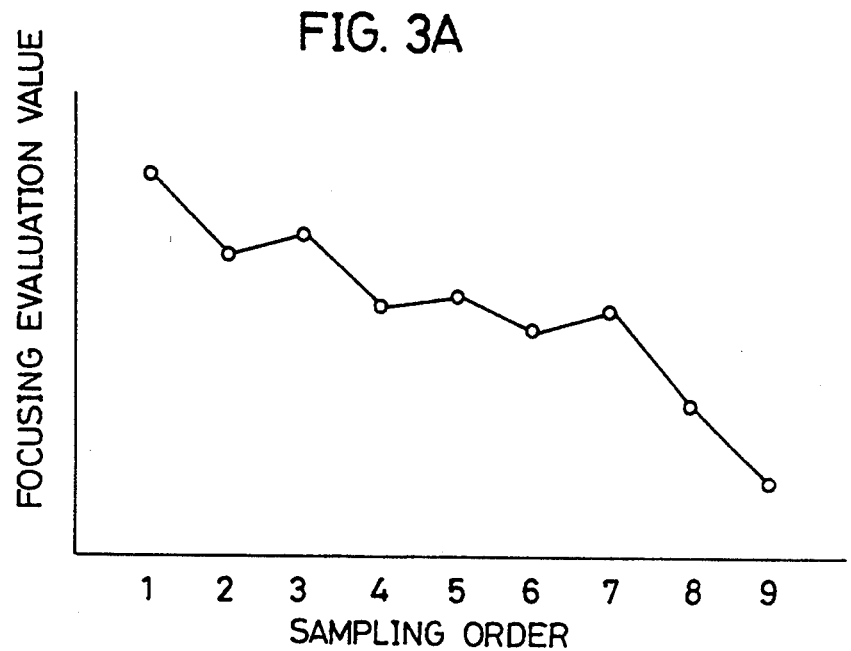
FIG. 3A is a schematic diagram illustrating one example of variation of focusing evaluation values.

Control circuit 21 always monitors a focusing evaluation value outputted from accumulating circuit 23, and a focusing variation value A and a focusing variation value R outputted by LSC circuit 22. Then, if the focusing variation value R is within a predetermined range, it makes a determination that the reliability of focusing evaluation values is high and performs control with continuous variation of focusing evaluation values as before. However, if, in spite that a focusing variation value A has a negative value and its absolute value exceeds a predetermined range, focusing evaluation values are not continuously decreasing, such variation as shown in FIG. 3A may be occurring, so that a determination is made that the peak has been gone over and the focusing lens is moved in the opposite direction.

Figure 3B:
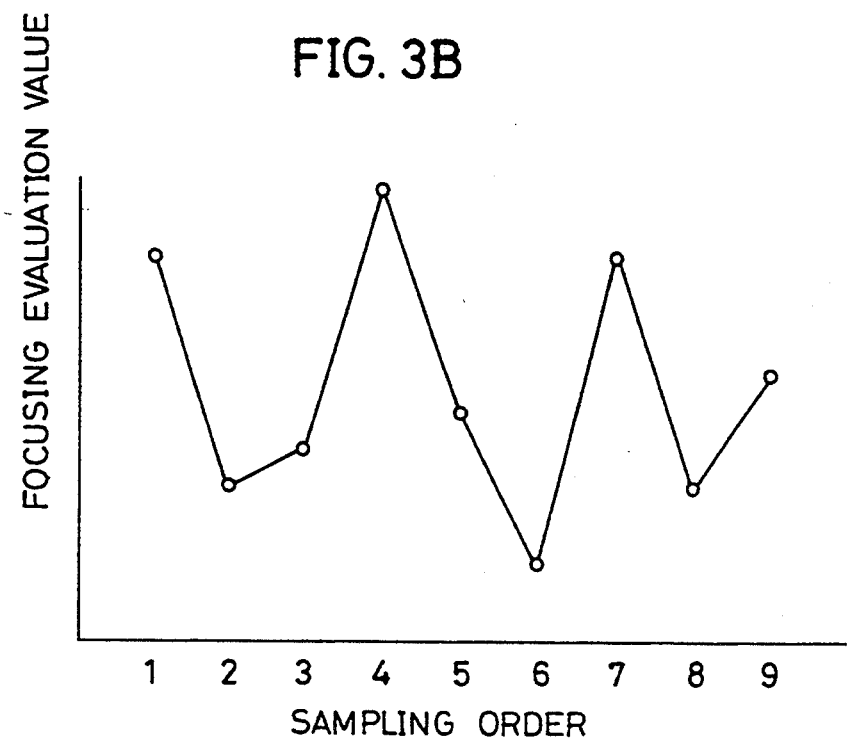
FIG. 3B is a schematic diagram illustrating another example of variation of focusing evaluation values.

On the other hand, when a focusing variation value R exceeds a predetermined range, since it can be considered that focusing evaluation values are varying without any order as shown in FIG. 3B, a determination is made that the reliability of focusing evaluation values is low, and focusing control is once interrupted and the focusing lens is stopped at that position. Then, after waiting for the focusing variation value R to come in the predetermined range, focusing control is started again.

As described above, by controlling using a focusing variation value A and a focusing variation value R, stable focusing operation can be performed. Accordingly, even if the reliability of focusing evaluation values decreases due to variation in field or the like, there is no fear of hunting or of largely getting out of focus as in conventional cases.

Figure 4:
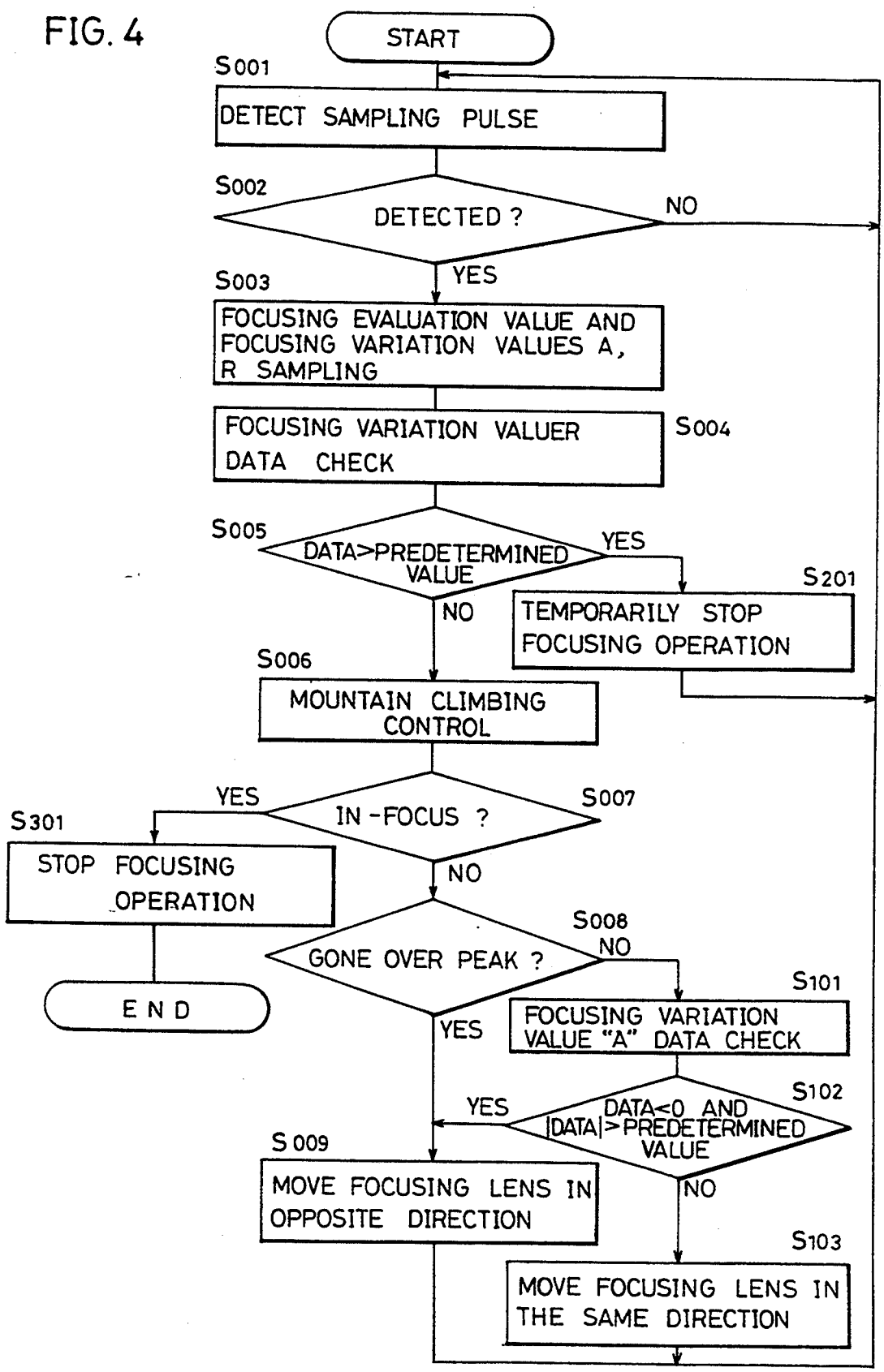
FIG. 4 is a flow chart illustrating one example of a program executed in the control circuit of FIG. 1.
Figure 5:
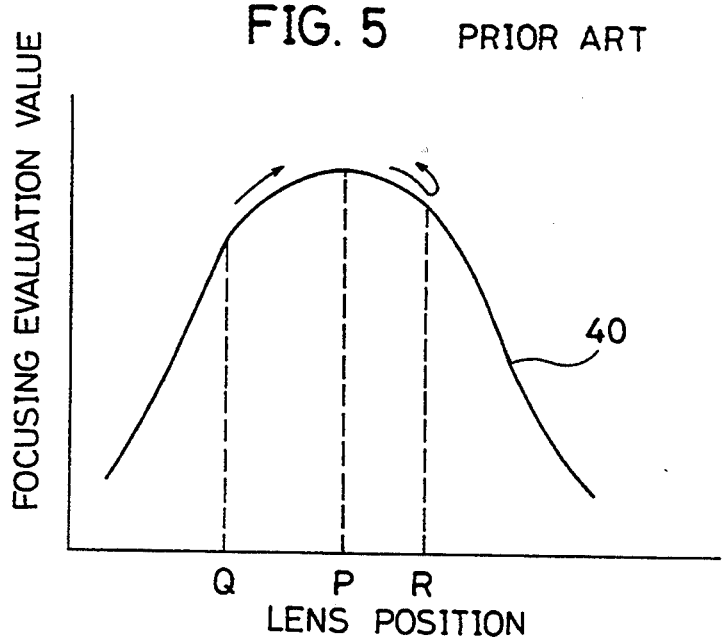
FIG. 5 is a characteristic diagram of focusing evaluation values for showing general principle of mountain climbing control.
Figure 6:
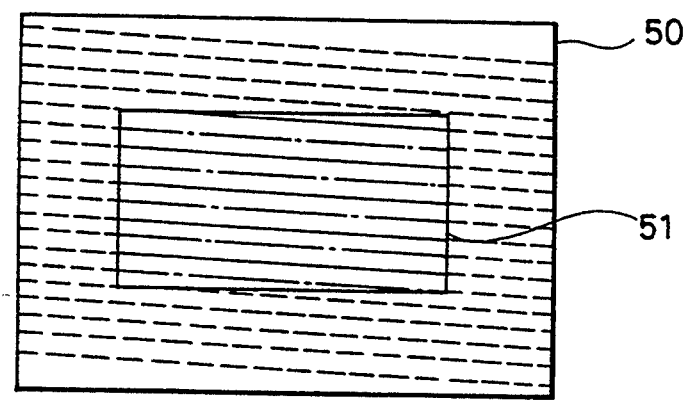
FIG. 6 is a schematic diagram of a general image-sensing field.

In practice, control circuit 21 is realized with a microcomputer or the like. FIG. 4 is a flow chart of one example of a program executed in control circuit 21. As shown in FIG. 4, the program performs control in the following steps.

In step S001, a detection of a sampling pulse is made.

In step S002, a determination is made as to whether detection of sampling pulse could be carried out or not. If the answer of the determination is YES, control proceeds to step S003, and if the answer of the determination is NO, control returns to step S001.

In step S003, a focusing evaluation value and focusing variation values A and R are sampled. Control proceeds to step S004 thereafter.

In step S004, a value of focusing variation value R is checked.

In step S005, a determination is made as to whether the checked value exceeds a predetermined value or not. If the answer of the determination is YES, since the reliability of the detected focusing evaluation value is low, control moves to step S201, and if the answer is NO, it proceeds to step S006.

In step S006, mountain climbing control with focusing evaluation values is performed.

In step S007, as a result of mountain climbing control, a determination is made as to whether an in-focus state has been accomplished or not. If the answer of the determination is YES, control proceeds to step S301 to stop automatic focusing operation, and if the answer is NO, it proceeds to step S008.

In step S008, a determination is made as to whether it has passed the peak or not. If the answer of the determination is YES, it proceeds to step S009 to reversely move the focusing lens, and if the answer is NO, a determination is made that it has not gone over the peak yet and the control moves to step S101.

In step S009, the focusing lens is moved in a direction opposite to that before. Subsequently, control returns to step S001.

When it proceeds to step S101, next, a value of focusing variation value A is checked. Control proceeds to step S102.

In step S102, a determination is made as to whether the checked data is negative, and also its absolute value exceeds a predetermined value or not. If the answer of determination is YES, it can be considered that the focusing evaluation value has a trend of decreasing and is changing as shown in FIG. 3A, and the control proceeds to step S009. On the other hand, if the answer is NO, control moves to step S103 to move the focusing lens in the same direction.

In step S103, the focusing lens is moved in the same direction as before. Subsequently, control returns to step S001.

When moving to step S201, since a determination is made that the reliability of focusing evaluation values is low, focusing is once stopped. Control returns to step S001 thereafter.

At step S301, because an in-focus point is reached, focusing is completely stopped. The processing of automatical focusing operation is then finished.

Control circuit 21 executes a program for controlling according to the flow chart shown in FIG. 4, so that focusing operation can be accurately carried out regardless of variation of focusing evaluation values. Therefore, problems, such as largely coming out of focus, occurrence of hunting and the like can be solved.

As described above, according to the present invention, focusing control is performed with trend of variation and reliability of focusing evaluation values, so that automatic focusing control can be accurately performed even when image-sensing an object moving in unstable directions.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic focusing device comprising:
   lens means for changing a focused field of an object;
   moving means for moving said lens means;
   extracting means for image-sensing the object through said lens means to extract a luminance signal;
   signal outputting means for outputting a focusing evaluation value signal for evaluating a focusing condition of the object on the basis of said extracted luminance signal;
   determination means for determining reliability of the focusing evaluation value signal; and
   control means for controlling said moving means on the basis of the determined reliability to improve focusing of the object;
   wherein said signal outputting means outputs the focusing evaluation signal for every field or every frame;
   wherein said determination means calculates a trend of variation and reliability based on a variation of the focusing evaluation value signal output for each field or each frame;
   wherein said determination means determines the trend of variation and reliability of the focusing evaluation value signal using an approximation method;
   wherein said control means controls said moving means so that said lens means is still when the determined reliability is less than a predetermined value.

2. The automatic focusing device of claim 1, wherein said determination means determines a straight line, approximating the variation of the focusing evaluation value signal for each field or each frame and determines the trend of variation and reliability from the straight line.

3. The automatic focusing device of claim 1, wherein said signal detecting means detects a level of a component in a predetermined frequency band included in said extracted luminance signal as the focusing evaluation signal.

4. The automatic focusing device of claim 1, wherein the approximation method is a method of least squares.

* * * * *

UNITED STATES PATENT AND TRADEMARK OFFICE
CERTIFICATE OF CORRECTION

PATENT NO. : 5,337,084
DATED : August 9, 1994
INVENTOR(S) : Takahiro Nakamura

It is certified that error appears in the above-indentified patent and that said Letters Patent is hereby corrected as shown below:

On the title page, item [54] and column 1, line 4, change "FOCUSSING" to --FOCUSING--

Signed and Sealed this

Twenty-fifth Day of October, 1994

Attest:

BRUCE LEHMAN

Attesting Officer

Commissioner of Patents and Trademarks